(12) United States Patent
Kinoshita

(10) Patent No.: US 10,570,486 B2
(45) Date of Patent: Feb. 25, 2020

(54) CERMET, AND METHOD FOR MANUFACTURING SAME, AS WELL AS CUTTING TOOL

(71) Applicant: KYOCERA Corporation, Kyoto-shi, Kyoto (JP)

(72) Inventor: Hideyoshi Kinoshita, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 733 days.

(21) Appl. No.: 14/899,097

(22) PCT Filed: Jun. 19, 2014

(86) PCT No.: PCT/JP2014/066303
§ 371 (c)(1),
(2) Date: Dec. 16, 2015

(87) PCT Pub. No.: WO2014/208447
PCT Pub. Date: Dec. 31, 2014

(65) Prior Publication Data
US 2016/0369380 A1  Dec. 22, 2016

(30) Foreign Application Priority Data

Jun. 28, 2013 (JP) .................... 2013-136834

(51) Int. Cl.

| | |
|---|---|
| *C22C 29/04* | (2006.01) |
| *B23B 27/14* | (2006.01) |
| *C04B 35/58* | (2006.01) |
| *C04B 35/64* | (2006.01) |
| *C22C 29/00* | (2006.01) |
| *B22F 5/00* | (2006.01) |

(52) U.S. Cl.
CPC ............ *C22C 29/04* (2013.01); *B23B 27/148* (2013.01); *C04B 35/58021* (2013.01); *C04B 35/64* (2013.01); *C22C 29/005* (2013.01); *B22F 2005/001* (2013.01); *B23B 2222/16* (2013.01); *C04B 2235/3839* (2013.01); *C04B 2235/3847* (2013.01); *C04B 2235/3856* (2013.01); *C04B 2235/3886* (2013.01); *C04B 2235/405* (2013.01); *C04B 2235/6562* (2013.01); *C04B 2235/6567* (2013.01)

(58) Field of Classification Search
CPC .......... B22F 2005/001; B23B 2222/16; B23B 27/148; C04B 2235/3839; C04B 2235/3847; C04B 2235/3856; C04B 2235/3886; C04B 2235/405; C04B 2235/6562; C04B 2235/6567; C04B 35/58021; C04B 35/64; C22C 29/005; C22C 29/04

See application file for complete search history.

(56) References Cited

U.S. PATENT DOCUMENTS

2008/0016985 A1* 1/2008 Tokunaga ............... C22C 29/02
75/238

FOREIGN PATENT DOCUMENTS

| JP | 1998-168537 A | 6/1998 |
| JP | 2010-274346 A | 12/2010 |
| JP | 2012-041595 A | 3/2012 |
| WO | 2014/084389 A1 | 6/2014 |

OTHER PUBLICATIONS

International Search Report (Form PCT/ISA/210) dated Sep. 22, 2014 and issued for International Application No. PCT/JP2014/066303.

* cited by examiner

*Primary Examiner* — Jenny R Wu
(74) *Attorney, Agent, or Firm* — Volpe and Koenig, P.C.

(57) ABSTRACT

A cermet (1) includes a bonding phase (2) and a hard phase (4). The hard phase (4) includes: a first hard phase (5) composed of TiCN; and a second hard phase (6) composed of a composite carbonitride of Ti, which is greater than the average particle diameter of the first hard phase (5). The cermet (1) further includes an aggregate part (10) formed by interlinking parts of the second hard phase (6). The second hard phase (6) forming the aggregate part (10) includes a 2a-th hard phase (7) having a maximum W content of an inner part thereof that is more than 1.1 times as great as an average W content of an outer circumferential part thereof, in terms of mass ratio. The aggregate part (10) composes a proportion of from 20% to 60% of the cermet (1) in terms of surface area.

6 Claims, 2 Drawing Sheets

CERMET, AND METHOD FOR MANUFACTURING SAME, AS WELL AS CUTTING TOOL

TECHNICAL FIELD

The present invention relates to a cermet suitable for a cutting tool, a wear resistant member, and the like, and to a method for manufacturing the cermet as well as the cutting tool.

BACKGROUND ART

Cermets including Ti as a main component have been widely used as a material of a member requiring wear resistance, slidability, and defect resistance for a cutting tool, a wear resistant member, a sliding member, and the like.

For example, Patent Document 1 discloses a cermet in which the following three types of hard phase are present. In a first B1 crystal, an outer circumferential part of a core part, having a carbonitride of an element, such as Ti, selected from among group IV elements of the periodic table or the like as a main component and having a particle diameter of not more than 1 μm, is surrounded by a peripheral part having a carbonitride of an element selected from among group V and group VI elements of the periodic table as a main component. Also, a second B1 crystal has a particle diameter that is greater than the particle diameter of the core part, being greater than 1 μm. Further, a third B1 crystal does not have a core part. An aggregate part is also present, in which the first B1 crystals and the third B1 crystals are aggregated.

CITATION LIST

Patent Literature

Patent Document 1: Japanese Unexamined Patent Application Publication No. H10-168537A

SUMMARY OF INVENTION

Technical Problem

However, while the composition disclosed in Patent Document 1, as described above, does have the effect of increasing the wear resistance and the defect resistance of the cutting tool, the defect resistance remains insufficient. Further improvements to the defect resistance have thus been sought. As such, the cermet of the present invention has been made in view of the above-described problem, and an object of the present invention is to provide a cermet having high defect resistance, and to a method for manufacturing the cermet as well as a cutting tool.

Solution to Problem

A cermet of the present invention includes a bonding phase including at least one of Co and Ni as a main component, and a hard phase composed of a carbonitride of at least one metal selected from among group IV, group V, and group VI metals of the periodic table. The hard phase includes a first hard phase composed of TiCN having an average particle diameter of from 0.05 μm to 1 μm, and a second hard phase composed of a composite carbonitride of Ti having an average particle diameter of from 0.2 μm to 2 μm, which is greater than the average particle diameter of the first hard phase, and at least one metal other than Ti selected from among group IV, group V, and group VI metals of the periodic table. The cermet further includes an aggregate part formed by interlinking parts of the second hard phase, the aggregate part having a particle diameter that is at least three times as great as the average particle diameter of the second hard phase. The second hard phase forming the aggregate part includes a 2a-th hard phase having a maximum W content of an inner part thereof that is more than 1.1 times as great as an average W content of an outer circumferential part thereof, in terms of mass ratio. The aggregate part composes a proportion of from 20% to 60% of the cermet in terms of surface area. The carbon content of the cermet is from 6.00% to 6.50% in terms of mass.

A method for manufacturing the cermet of the present invention includes forming a compound powder by combining a TiCN powder, at least one of a carbide powder, a nitride powder, and a carbonitride powder, other than TiCN, of a metal selected from among group IV, group V, and group VI metals of the periodic table, at least one of a Co powder and a Ni powder, and at least one of a metallic W powder and a $WC_{1-x}$ powder (where $0 < x \le 1$), and baking the compound powder under the following conditions:

(a) raising a temperature from room temperature to 1200° C.; (b) in a vacuum, raising the temperature from 1200° C. to a baking temperature $T_1$ of from 1330° C. to 1380° C. at a temperature increase rate a of from 0.1° C./min to 2° C./min; (c) in one of the vacuum and an inert gas atmosphere at from 30 Pa to 2000 Pa, raising the temperature from the baking temperature $T_1$ to a baking temperature $T_2$ of from 1500° C. to 1600° C. at a temperature increase rate b of from 4° C./min to 15° C./min; and (d) in one of the vacuum and the inert gas atmosphere at from 30 Pa to 2000 Pa, maintaining the baking temperature $T_2$ for from 0.5 hours to 2 hours, and lowering the temperature.

A cutting tool of the present invention includes the above-described cermet as a base.

Advantageous Effects of Invention

The cermet of the present invention enables high wear resistance performance to be maintained, and improves defect resistance.

Also, the method for manufacturing the cermet of the present invention enables the cermet to be manufactured with the above-described high wear resistance and defect resistance.

Furthermore, the cutting tool of the present invention enables long-term cutting because the cutting tool includes the above-described cermet as a base.

DESCRIPTION OF EMBODIMENT

Figure 1:
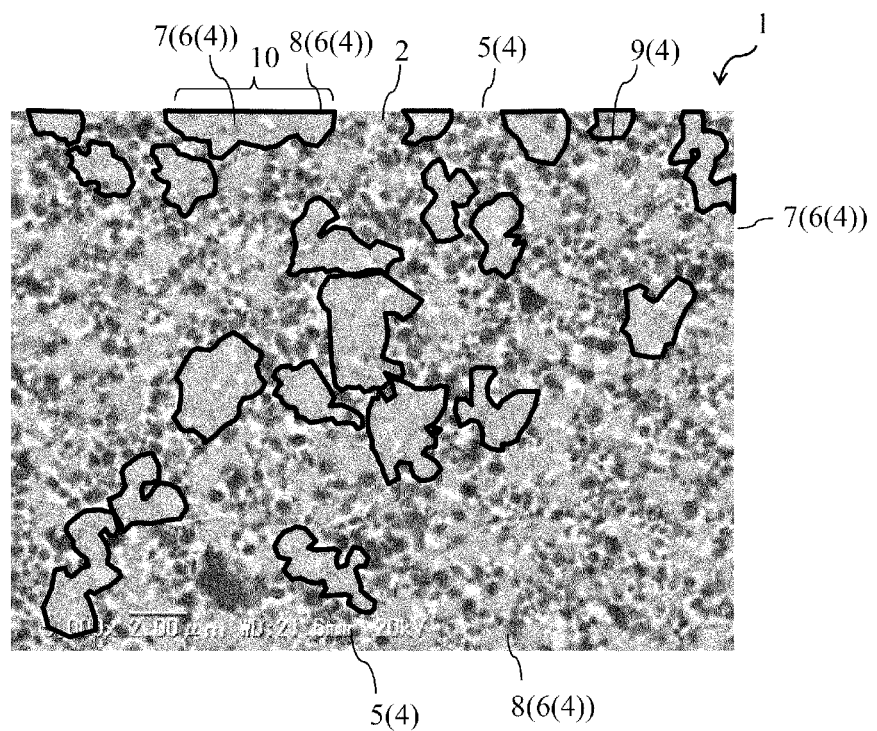
FIG. 1 is a scanning electron microscope photograph of a cross-section illustrating an example of a cermet of the present invention.
Figure 2:
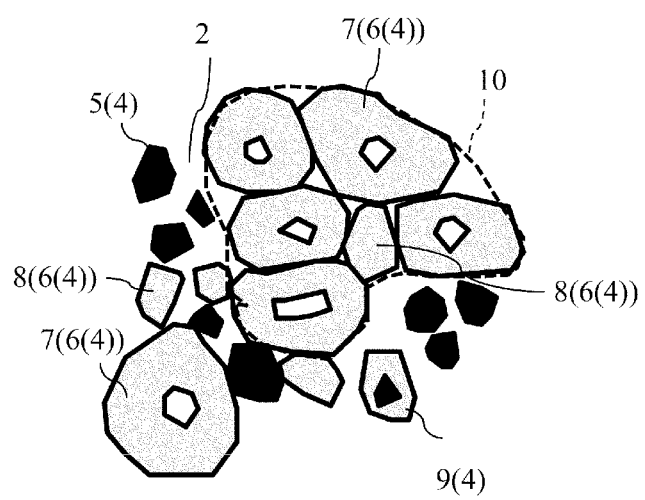
FIG. 2 is a schematic diagram illustrating an example of the cermet of the present invention.

An example of a cermet of the present invention is described with reference to FIG. 1, which is a scanning electron microscope (SEM) photograph of a cross-section of the cermet.

A cermet 1 of the present invention includes a bonding phase (appearing white in the photograph of FIG. 1) 2 including at least one of Co and Ni as a main component, and a hard phase 4 composed of a carbonitride of at least one metal selected from among group IV, group V, and group VI metals of the periodic table. The hard phase 4 includes a first hard phase 5 (appearing black in the photograph of FIG. 1) composed of TiCN and a second hard phase 6 composed of a composite carbonitride of Ti and at least one metal other than Ti selected from among group IV, group V, and group VI metals of the periodic table.

In the present embodiment, the first hard phase 5 has an average particle diameter of from 0.05 μm to 1 μm. Also, the second hard phase 6 has an average particle diameter of from 0.2 μm to 2 μm, which is greater than the average particle diameter of the first hard phase 5. Furthermore, the second hard phase 6 forms an aggregate part 10 having a particle diameter that is at least three times as great as the average particle diameter of the second hard phase 6. The aggregate part 10 composes a proportion of from 20% to 60% of the cermet 1, in terms of surface area. The second hard phase 6 forming the aggregate part 10 includes a 2a-th hard phase 7. The 2a-th hard phase 7 has a maximum W content of an inner part thereof that is more than 1.1 times as great as an average W content of an outer circumferential part thereof, in terms of mass ratio (in the photograph of FIG. 1, a central part appears a shade of gray that is almost white and the outer circumferential part appears gray). Also, the carbon content of the cermet 1 is from 6.00% to 6.50% in terms of mass.

This improves the defect resistance of the cermet 1. That is, the cermet 1 has a carbon content of from 6.00% to 6.50%, in terms of mass, which is low in comparison to conventional technology. Thus, the cermet 1 has improved toughness in that the cermet 1 is unlikely to exhibit the high hardness of carbide. Also, the first hard phase 5 has an average particle diameter of from 0.05 μm to 1 μm. As such, decreasing hardness of the cermet 1 may be constrained. As a result, the defect resistance of the cermet 1 is improved without decreasing the wear resistance. In addition, the 2a-th hard phase 7 is composed of a composite carbonitride of Ti and at least one metal other than Ti selected from among group IV, group V, and group VI metals of the periodic table. The 2a-th hard phase 7 has a maximum W content of an inner part thereof that is more than 1.1 times as great as an average W content of an outer circumferential part thereof, in terms of mass ratio, thereby increasing the toughness of the 2a-th hard phase 7. Furthermore, the 2a-th hard phase 7 is present in the aggregate part 10, which has a size that is equal to or greater than a predetermined size. The aggregate part 10 composes a proportion of from 20% to 60% of the cermet 1, in terms of surface area. Accordingly, the aggregate part 10 has an effect of suppressing the development of cracks. Here, the inner part of the hard phase 4 in the present invention corresponds to a region on an inner side of a range starting at an outer circumference of the hard phase 4 and having 0.1 times the thickness of the hard phase 4 at a maximum diameter.

That is, the aggregate part 10 does not have a core particle structure, such as the configuration indicated in Patent Document 1, which includes a black core part made from TiCN and a gray peripheral part made from a composite carbonitride of Ti, W, and the like, in which a boundary is present between the core part and the peripheral part such that cracks progress along the boundary. Rather, the hard phase 4 is present in plurality and interlinked within the aggregate part 10, with a strong effect of crack deflection. As such, the aggregate part 10 has a strong effect of weakening the energy of crack progression, as crack progression is complex in comparison to a hard phase formed with a simple, uniform composition. Additionally, the 2a-th hard phase 7 has superb toughness and enables further improvement to the defect resistance of the cermet. The 2a-th hard phase 7 may also be present outside the aggregate part 10.

In the present embodiment, a proportion of SB to SA (SB/SA), where SA is a proportion of surface area of the cermet 1 occupied by the first hard phase 5 and SB is a proportion of the surface area of the cermet 1 occupied by the 2a-th hard phase 7, is from 1.0 to 2.5. Within this range, the defect resistance of the cermet 1 may be improved without decreasing the wear resistance thereof.

Here, the second hard phase 6 is composed of a composite carbonitride of Ti and at least one metal other than Ti selected from among group IV, group V, and group VI metals of the periodic table. However, the second hard phase 6 also includes the 2a-th hard phase 7 having a maximum W content of an inner part thereof that is more than 1.1 times as great as an average W content of an outer circumferential part thereof, in terms of mass ratio, and a 2b-th hard phase 8 having a maximum W content of an inner part thereof that is equal to or less than 1.1 times as great as an average W content of an outer circumferential part thereof, in terms of mass ratio. The 2b-th hard phase 8 may be present in the aggregate part 10 along with the 2a-th hard phase 7. A proportion of surface area of the cermet 1 occupied by the 2b-th hard phase 8 (SC) is from 0% to 40% of the overall composition of the cermet 1.

Also, a third hard phase 9 may be present as the hard phase 4. The third hard phase 9 is composed of a core part that is composed of TiCN and an outer circumferential part that is composed of a composite carbonitride of Ti and at least one metal other than Ti selected from among group IV, group V, and group VI metals of the periodic table. The third hard phase 9 may also be present in the aggregate part 10, along with the 2a-th hard phase 7. A proportion of surface area of the cermet 1 occupied by the third hard phase 9 (SD) is from 0% to 30% of the overall composition of the cermet 1, in terms of surface area.

The hard phase 4 (i.e., the first hard phase 5, the 2a-th hard phase 7, the 2b-th hard phase 8, and the third hard phase 9) may be identified by checking the distribution state of elemental W in the hard phase using one of an electron probe microanalyser (EPMA) and Auger analysis. Specifically, the composition of the cermet 1 is analyzed by observing a cross-section of the cermet 1 using a scanning electron microscope (SEM). EPMA surface analysis is performed on the observed region, and the proportion of the metals is checked at each position. The SEM photograph and the EPMA surface analysis results are then cross-referenced to identify the hard phase 4 (i.e., the first hard phase 5, the second hard phase 6, and the third hard phase). Density analysis of W in the phase is then performed on the second hard phase 6. The average value of the W content is calculated at five points of the outer circumferential part, taking a range starting from the outer circumference of the second hard phase 6 and having 0.1 times the thickness of the second hard phase 6 at a maximum diameter as the outer circumferential part. The 2a-th hard phase 7 and the 2b-th hard phase 8 are identified by checking the W content in the inner part of the second hard phase 6, which is on the inner side of the outer circumferential part of the second hard phase 6, and checking whether or not the W density is at least 1.1 times the average value of the outer circumferential part. In a situation where the particle diameter of the second hard phase 6 is small and the EPMA has insufficient resolution, Auger analysis is used to perform mapping of elemental metals.

The average particle diameter of the hard phase 4 (i.e., the first hard phase 5, the 2a-th hard phase 7, the 2b-th hard phase 8, and the third hard phase 9) is measured using the following method. First, at least three selected regions, each being at least 6 μm by at least 6 μm in size, are observed using the scanning electron microscope and photographs are taken thereof. Each location of the hard phase 4 is identified in the photographs, and the average particle diameter of the first hard phase 5 and the second hard phase 6 is calculated. When identifying the hard phase 4, any narrow part is used as a boundary between the hard phase 4 and another hard phase, thereby specifying a contour. The following determination is performed in a situation where the first hard phase 5 is present inside the contour. Where the first hard phase 5 is completely surrounded by the second hard phase 6, the first hard phase 5 is placed within the contour and identified as the third hard phase 9. Where the first hard phase 5 is not completely surrounded by the second hard phase 6, and the first hard phase 5 is present at a position extrapolated from the outer circumference of the second hard phase 6, the contour is specified so as to place the first hard phase 5 outside the contour. Then, the surface area of each contour is determined, and the average value for the contours in the at least three regions in the photograph is calculated. This average surface area is expressed as a circle, and used to calculate the average particle diameter of the hard phase 4 at each location.

In addition, the aggregate part 10 is specified using the following method. First, at least three selected regions, each being at least 10 μm by at least 10 μm in size, are observed using the scanning electron microscope and photographs are taken thereof. A region in which the second hard phases 6 are interlinked is identified in the photograph. In specifying an interlinked region, a narrow part between second hard phases 6 is determined as follows. A narrow part having a width of not less than the average particle diameter is considered a part of the interlinked region. A narrow part having a width of less than the average particle diameter is considered a part of a different interlinked region. The aggregate part may incorporate the bonding phase 2 and the first hard phase 5. Where the first hard phase 5 is completely surrounded by the second hard phase 6, the first hard phase 5 is considered to be incorporated within the second hard phase 6 and the interlinked part is specified so as to place the first hard phase 5 within the contour. Where the first hard phase 5 is not completely surrounded by the second hard phase 6, and the first hard phase 5 is present outside the second hard phase 6, the interlinked part is specified so as to place the first hard phase 5 outside the contour. The respective maximum lengths of the specified interlinked regions are specified. Then, an interlinked region in which the maximum length is at least three times that of the average particle in the second hard phase 6 is specified as being the aggregate part 10. In other words, an interlinked region may be present in which the particle diameter is less than three times the average particle diameter of the second hard phase 6. Such an interlinked region is not considered to be the aggregate part 10 of the present invention. The average value of the surface area proportions of the aggregate parts 10 in the at least three regions in the photograph is taken to be the surface area proportion of the aggregate part 10. The contour specifying the aggregate part 10 is indicated in FIG. 1.

Here, having the average particle diameter of the first hard phase 5 be less than 0.05 μm leads to aggregation of the first hard phase 5 and worsens dispersion state within the cermet 1, which tends to decrease the hardness of the cermet 1. Also, having the average particle diameter 1 of the first hard phase 5 be greater than 1 μm decreases the hardness of the cermet 1. The desirable range of average particle diameter of the first hard phase 5 is from 0.3 μm to 0.7 μm. Furthermore, having the average particle diameter of the second hard phase 6 be less than 0.2 μm, and alternatively, be less than the average particle diameter of the first hard phase 5, decreases the toughness of the cermet 1. Having the average particle diameter of the second hard phase 6 be greater than 2 μm decreases the hardness of the cermet 1. Furthermore, having the above-described aggregate part 10 not compose a proportion of from 20% to 60% of the cermet 1 in terms of surface area decreases the defect resistance of the cermet 1. The desirable range of surface area proportion of the aggregate part 10 is from 30% to 50%, in terms of surface area. Here, the second hard phase 6 may also be present outside the aggregate part 10.

Also, in the present embodiment, a proportion ($d_B/d_A$), where $d_A$ is the average particle diameter of the first hard phase 5 in the cermet 1 and $d_B$ is the average particle diameter of the 2a-th hard phase 7, is from 3.0 to 10. This has the effect of improving wear resistance of the cermet 1.

In addition, having the carbon content of the cermet 1 be less than 6.00% in terms of mass decreases the hardness of the cermet 1. Conversely, having the carbon content of the cermet 1 be greater than 6.50% in terms of mass decreases the defect resistance of the cermet 1.

Furthermore, according to the present embodiment, upon measuring residual stress on the surface of the cermet 1 using X-ray diffraction measurement to apply the 2θ−sin 2ψ technique, the residual stress on the TiCN is from −500 MPa to −1200 MPa, the residual stress on the composite carbonitride is from −1000 MPa to −1500 MPa, and the residual stress on the bonding phase 2 is from −400 MPa to −800 MPa. Here, the minus signs indicate compressive stress. In other words, on the surface of the cermet 1, compressive stress acts on the TiCN of the hard phase 4, as well as on the composite carbonitride and the bonding phase. As such, the compressive stress acting on the surface of the cermet 1 enables the development of cracks produced on the surface of the cermet 1 to be further suppressed, and enables the defect resistance of the cermet 1 to be improved. Here, the residual stress on the TiCN is the total residual stress on the TiCN of the first hard phase 5 and the core part of the third hard phase 9. The residual stress on the composite carbonitride is the total residual stress on the second hard phase 6 and the peripheral part of the third hard phase 9. The X-ray diffraction peak attributable to the TiCN and the X-ray diffraction peak attributable to the composite carbonitride are detected as distinct peaks. The Co and Ni making up the bonding phase 2 are in an overall solid solution, and are thus detected as a single peak. This peak is identified as corresponding to whichever of Co and Ni is present in greater proportion.

In the present embodiment, a total proportion of one of a nitride and a carbonitride of a metal selected from among group IV, group V, and group VI metals of the periodic table, having Ti as a main component and forming the hard phase 4, is from 70% to 90% in terms of mass within the cermet 1, and is specifically from 80% to 90%, in terms of mass, for wear resistance improvement considerations. Conversely, given that the bonding phase 2 is present in a proportion of from 10% to 30% in terms of mass, the cermet 1 achieves superb balance between hardness and toughness. The desirable range for the bonding phase is from 10% to 25% in terms of mass. In the present embodiment, the respective proportions of metal elements to the total amount of metal elements in the cermet 1 are, in terms of mass, from 40% to 70% for Ti, from 10% to 30% for W, from 0% to 20% for Nb, from 0% to 10% for Mo, from 0% to 10% for Ta, from 0% to 5% for V, from 0% to 5% for Zr, from 5% to 20% for Co, and from 3% to 15% for Ni. According to these ranges of composition, the cermet 1 is provided with high wear resistance and defect resistance. The respective proportions of metal elements to the total amount of metal elements in the cermet 1 may be measured using ICP analysis.

The cermet of the present invention, as described above, has high wear resistance and defect resistance, and is thus suitable for use as a cutting tool, a drilling tool, and a wear resistant member, and is especially suitable for use as a cutting tool.

(Manufacturing Method)

Next, a manufacturing method for the above-described tool is described.

First, a TiCN powder having an average particle diameter of from 0.1 μm to 1.2 μm and specifically from 0.3 μm to 0.9 μm, at least one of a carbide powder, a nitride powder, and a carbonitride powder other than TiCN of a metal selected from among group IV, group V, and group VI metals of the periodic table, a predetermined amount of metallic Co powder, metallic Ni powder, and the like having an average particle diameter of from 0.2 μm to 5 μm, and at least one of a metallic W powder and a $WC_{1-x}$ (where $0<x\leq1$) powder having an average particle diameter of from 2 μm to 10 μm are combined, to which a carbon powder is added as desired, to prepare a compound powder.

In the present embodiment, a powder having an average particle diameter of from 0.1 μm to 3 μm of any one of TiN, WC, NbC, MoC, TaC, VC, and ZrC is appropriately used as the at least one of a carbide powder, a nitride powder, and a carbonitride powder other than TiCN of the metal selected from among group IV, group V, and group VI metals of the periodic table.

The compound powder is prepared by adding a binder, a solvent, and the like to the base powders measured as described above, and using a known mixing method such as ball milling, vibration milling, jet milling, attritor milling, and the like. Attritor milling is used in the present embodiment. Combining the powders using attritor milling crushes the base powders and thus reduces the particle diameters of the base powders. However, this crushing tends to lead to further aggregation due to the high ductility of the at least one of the metallic W powder and the $WC_{1-x}$ (where $0<x\leq1$) powder, the metallic Co powder, and the metallic Ni powder. The compound powder is then molded into a predetermined shape using a known molding method such as press molding, extrusion molding, injection molding, and the like.

Next, according to the present invention, the above-described molded body is baked in one of a vacuum and an inert gas atmosphere. According to the present embodiment, baking under the following conditions enables the cermet to be manufactured with the predetermined composition described above. The specific baking conditions are as follows: (a) increasing temperature from room temperature to 1200° C., (b) in a vacuum, increasing temperature from 1200° C. to a baking temperature $T_1$ of from 1330° C. to 1380° C. at a temperature increase rate a of from 0.1° C./min to 2° C./min, (c) in one of a vacuum and an inert gas atmosphere at from 30 Pa to 2000 Pa, increasing the temperature from the baking temperature $T_1$ to a baking temperature $T_2$ of from 1500° C. to 1600° C. at a temperature increase rate b of from 4° C./min to 15° C./min, and (d), in one of a vacuum and an inert gas atmosphere at from 30 Pa to 2000 Pa, maintaining the baking temperature $T_2$ for a duration of from 0.5 hours to 2 hours, then decreasing the temperature.

Controlling the above described temperature increase pattern and the introduction timing of a predetermined amount of inert gas during baking causes the at least one of the metallic W powder and the $WC_{1-x}$ powder (where $0<x\leq1$) aggregated in the compound powder to be carbonized and nitrided while forming a solid solution with the other elements of group IV, group V, and group VI of the periodic table, forming the aggregate part. In addition, the Co powder, the Ni powder, and the like dissolve while forming a solid solution with each other, thus coming to surround the periphery of the hard phase and binding the hard phases. As a result, the cermet 1 is manufactured with the above-described composition.

That is, having the temperature increase rate in process (b) be slower than 0.1° C./min overly extends the baking time and is not realistic. Also, having the temperature increase rate in process (b) be faster than 2° C./min does not provide sufficient development of sintering the aggregated metallic Co powder and metallic Ni powder, and makes the aggregate part 10 less likely to form due to degraded sinterability of the metallic W powder. In addition, having the temperature increase rate in process (c) be slower than 4° C./min makes the second hard phase 2, which has a high W content in the inner part, unlikely to be formed. Having the temperature increase rate in process (c) be faster than 15° C./min makes the aggregate part 10 unlikely to form due to excessive sinterability of the metallic W powder. Having the baking temperature $T_2$ be less than 1500° C. makes the second hard phase unlikely to form. Having the baking temperature $T_2$ be greater than 1600° C. activates sinterability in the aggregate part 10 and results in the aggregate part 10 forming a single unified hard phase.

A cover layer is then formed on the surface of the cermet 1, as desired. The physical vapor deposition (PVD), such as ion plating, and sputtering, is preferably suitable as the formation method for the cover layer.

Example

A compound powder prepared by combining, according to the proportions shown in Table 1, a TiCN powder having an average particle diameter of 0.6 μm, a WC powder having an average particle diameter of 1.1 μm, a TiN powder having an average particle diameter of 1.5 μm, a TaC powder having an average particle diameter of 2 μm, an NbC powder having an average particle diameter of 1.5 μm, an MoC powder having an average particle diameter of 2.0 μm, a ZrC powder having an average particle diameter of 1.8 μm, a VC powder having an average particle diameter of 1.0 μm, a W powder having an average particle diameter of 6 μm, a $WC_{0.5}$ powder having an average particle diameter of 6 μm (in Table 1, the W powder and the $WC_{0.5}$ powder are listed as W·$WC_{1-x}$) a Ni powder having an average particle diameter of 2.4 μm, and a Co powder having an average particle diameter of 1.9 μm, each measured using the micro-track method, was prepared using a stainless steel ball mill and a cemented carbide ball, and subjected to a wet mixing process in isopropyl alcohol (IPA). Then paraffin was then added to the compound powder at 3% by mass, and the compound powder was combined using attritor milling. Afterward, a powder granulated by spray drying was used to form a CNMG 120408 cutting tool (throw-away insert) shape at 200 MPa using press molding.

Then, baking was performed under the following baking conditions: (a) the temperature was increased from room temperature to 1200° C., (b) in a vacuum, the temperature was increased from 1200° C. to 1350° C. at the temperature increase rate a shown in Table 1 (listed as rate a in Table 1), (c) in an $N_2$ gas atmosphere at 1000 Pa, the temperature was increased from the baking temperature of 1350° C. to the baking temperature $T_2$ shown in Table 1 at the temperature increase rate b shown in Table 1 (listed as rate b in Table 1), and (d) in the $N_2$ gas atmosphere at 1000 Pa, the baking temperature $T_2$ was maintained for one hour, and the temperature was then decreased.

The cutting tool so obtained was observed with a scanning electron microscope (SEM) and a photograph was taken at 5000× magnification. Five positions on a cross-section of the cermet were selected and observed. The type of each hard phase was identified using an electron probe microanalyser (EPMA). Commercial image analysis software was used to perform image analysis on a region measuring 8 μm by 8 μm in each position, and the density of each metal in the hard phase was checked to confirm the presence of the first hard phase, the 2a-th hard phase, the 2b-th hard phase, the third hard phase, and the aggregate part. Then, the average particle diameters ($d_A$, $d_B$) of the first hard phase and the second hard phase were measured, and the surface area ratios (of the first hard phase (SA), the 2a-th hard phase (SB), the 2b-th hard phase (SC), the third hard phase (SD), and the bonding phase) were measured within the field of vision to calculate the ratio (SB/SA). Also, the carbon analysis method was used to measure the carbon content of the cermet relative to a standard specimen of a cemented carbide alloy whose carbon content is known. The results are given in Table 2.

In addition, ICP analysis was used to calculate the metal content in the cermet. Furthermore, the residual stress on the first hard phase was measured from the high-angle side peak of TiCN (422), the residual stress on the second hard phase was measured from the low-angle side peak of TiCN (422), and the residual stress on the bonding phase was measured from the peak of Co (311), by the 2θ−sin 2ψ technique using X-ray diffraction measurement. Here, the minus signs of the residual stresses listed in Table 3 indicate compressive stress. The results are given in Table 3.

Next, cutting testing was performed under the following cutting conditions, using the obtained cutting tool. The results are given along with Table 3.

(Defect Resistance Testing)
Cut Material: S45C
Cutting Speed: 100 m/min
Feed: 0.1 mm/rev to 0.5 mm/rev (+0.05 mm/rev per 10 seconds of feed)
Cut Size: 2.0 mm
Cutting State: Dry
Evaluation Method: Cutting Time to Failure (Seconds)

TABLE 1

| Specimen No. | Base Powder Composition (% by mass) | | | | | | | | | | Baking Conditions | | | |
|---|---|---|---|---|---|---|---|---|---|---|---|---|---|---|
| | TiCN | WC | TiN | TaC | MoC | NbC | ZrC | VC | Ni | Co | W·WC$_{1-x}$ Type | % by mass | Rate a (° C./min) | Rate b (° C./min) | T2 (° C.) |
| 1 | 37 | 5 | 10 | 2 | 2 | 10 | 1 | 0 | 10 | 15 | W | 8 | 1.5 | 5 | 1550 |
| 2 | 48 | 10 | 12 | 1 | 1 | 8 | 2 | 1 | 8 | 8 | WC$_{0.5}$ | 1 | 0.7 | 10 | 1550 |
| 3 | 46 | 10 | 10 | 1 | 1 | 5 | 2 | 1 | 8 | 12 | W | 4 | 0.5 | 7 | 1550 |
| 4 | 43 | 7 | 11 | 0 | 0 | 11 | 0.5 | 1.5 | 10 | 10 | W | 6 | 0.7 | 8 | 1575 |
| 5 | 48 | 10 | 12 | 3 | 0 | 6 | 1 | 0 | 8 | 10 | W | 2 | 1.0 | 4 | 1525 |
| 6 | 48 | 10 | 3 | 1 | 0 | 11 | 0 | 2 | 10 | 10 | W | 5 | 0.3 | 15 | 1550 |
| 7 | 46 | 13 | 7 | 2 | 0 | 10 | 0 | 1 | 5 | 13 | W WC$_{0.5}$ | 2 1 | 0.7 | 10 | 1575 |
| 8 | 43 | 13 | 11 | 0 | 0 | 11 | 0.5 | 1.5 | 10 | 10 | — | | 1.0 | 10 | 1575 |
| 9 | 51.5 | 14 | 10 | 1 | 0 | 8 | 0.5 | 2 | 4 | 8 | W | 1 | 5.0 | 5 | 1550 |
| 10 | 43 | 13 | 10 | 1 | 1 | 9 | 1 | 1 | 8 | 10 | W | 3 | 1.0 | 2 | 1600 |
| 11 | 43 | 13 | 10 | 1 | 1 | 9 | 1 | 1 | 8 | 10 | W | 3 | 1.0 | 18 | 1550 |
| 12 | 43 | 13 | 10 | 1 | 1 | 9 | 1 | 1 | 8 | 10 | W | 3 | 5.0 | 8 | 1450 |
| 13 | 43 | 13 | 10 | 1 | 1 | 9 | 1 | 1 | 8 | 10 | W | 3 | 5.0 | 8 | 1650 |

TABLE 2

| Specimen No. | Cermet | | | | | | | | | | Aggregate Part | |
|---|---|---|---|---|---|---|---|---|---|---|---|---|
| | Carbon Content (% by mass) | Average Particle Diameter (μm) | | | Surface Area Proportion (% by area) | | | | Bonding Phase | SB/SA | Average Particle Diameter (μm) | Surface Area Proportion (% by area) |
| | | $d_A$ | $d_B$ | $d_B/d_A$ | SA | SB | SC | SD | | | | |
| 1 | 6.10 | 0.34 | 1.35 | 3.97 | 27 | 30 | 20 | 7 | 16 | 1.11 | 4.10 | 45.00 |
| 2 | 6.50 | 0.40 | 1.20 | 3.00 | 25 | 26 | 35 | 3 | 11 | 1.04 | 4.00 | 25.00 |
| 3 | 6.20 | 0.38 | 1.35 | 3.55 | 38 | 27 | 17 | 3 | 15 | 0.71 | 4.20 | 30.00 |
| 4 | 6.15 | 0.35 | 1.10 | 3.14 | 33 | 34 | 16 | 3 | 14 | 1.03 | 3.60 | 40.00 |
| 5 | 6.30 | 0.25 | 1.23 | 4.92 | 35 | 37 | 11 | 4 | 13 | 1.06 | 3.90 | 30.00 |

TABLE 2-continued

| | Cermet | | | | | | | | | | Aggregate Part | |
|---|---|---|---|---|---|---|---|---|---|---|---|---|
| | Carbon Content | Average Particle Diameter (μm) | | | Surface Area Proportion (% by area) | | | | | | Average Particle Diameter | Surface Area Proportion |
| Specimen No. | (% by mass) | $d_A$ | $d_B$ | $d_B/d_A$ | SA | SB | SC | SD | Bonding Phase | SB/SA | (μm) | (% by area) |
| 6 | 6.25 | 0.38 | 1.42 | 3.74 | 20 | 35 | 26 | 5 | 14 | 1.75 | 4.60 | 35.00 |
| 7 | 6.45 | 0.40 | 1.35 | 3.38 | 27 | 37 | 20 | 7 | 9 | 1.37 | 4.20 | 30.00 |
| 8 | 6.70 | 0.45 | 1.20 | 2.67 | 25 | 15 | 40 | 5 | 15 | 0.60 | — | — |
| 9 | 6.45 | 0.28 | 1.23 | 4.39 | 26 | 31 | 30 | 5 | 8 | 1.19 | — | — |
| 10 | 6.25 | 0.37 | — | — | 30 | 25 | 25 | 6 | 14 | — | (2.80)[1] | (30.00)[1] |
| 11 | 6.30 | 0.35 | 1.25 | 3.57 | 40 | — | 35 | 11 | 14 | — | — | — |
| 12 | 6.50 | 0.30 | — | — | 55 | — | 25 | 7 | 13 | — | — | — |
| 13 | 6.20 | 0.37 | — | — | 13 | — | 70 | 4 | 13 | — | — | — |

[1] Aggregate part in 2b-th hard phase

TABLE 3

| Specimen No. | Metal Content Proportion in Cermet (% by mass) | | | | | | | | | Residual Stress (MPa) | | | Cutting Time (s) |
|---|---|---|---|---|---|---|---|---|---|---|---|---|---|
| | Ti | W | Ta | Mo | Nb | Zr | V | Ni | Co | TiCN | Composite Carbonitride | Bonding Phase | |
| 1 | 41.90 | 14.44 | 2.13 | 2.02 | 10.07 | 1.01 | 0 | 11.37 | 17.06 | −830 | −1145 | −587 | 80 |
| 2 | 55.37 | 12.23 | 1.14 | 1.05 | 8.34 | 2.08 | 0.95 | 9.42 | 9.42 | −472 | −952 | −321 | 68 |
| 3 | 50.99 | 15.54 | 1.09 | 1.03 | 5.14 | 2.05 | 0.94 | 9.29 | 13.93 | −1190 | −1420 | −452 | 82 |
| 4 | 49.04 | 14.57 | 0 | 0 | 11.29 | 0.51 | 1.41 | 11.59 | 11.59 | −935 | −1287 | −679 | 85 |
| 5 | 55.06 | 13.33 | 3.29 | 0 | 6.22 | 1.03 | 0 | 9.36 | 11.71 | −643 | −1022 | −421 | 72 |
| 6 | 46.18 | 16.58 | 1.08 | 0 | 11.23 | 0 | 1.87 | 11.53 | 11.53 | −775 | −1253 | −518 | 75 |
| 7 | 48.20 | 17.58 | 2.17 | 0 | 10.26 | 0 | 0.94 | 5.79 | 15.06 | −668 | −1085 | −643 | 70 |
| 8 | 49.26 | 14.20 | 0 | 0 | 11.34 | 0.51 | 1.41 | 11.64 | 11.64 | −322 | −812 | −269 | 55 |
| 9 | 57.11 | 16.74 | 1.11 | 0 | 8.39 | 0.52 | 1.92 | 4.74 | 9.47 | −493 | −978 | −15 | 45 |
| 10 | 48.18 | 17.63 | 1.09 | 1.03 | 9.24 | 1.02 | 0.94 | 9.28 | 11.59 | −427 | −805 | −363 | 41 |
| 11 | 48.18 | 17.63 | 1.09 | 1.03 | 9.24 | 1.02 | 0.94 | 9.28 | 11.59 | −826 | −670 | −434 | 50 |
| 12 | 48.18 | 17.63 | 1.09 | 1.03 | 9.24 | 1.02 | 0.94 | 9.28 | 11.59 | −255 | −358 | −100 | 51 |
| 13 | 48.18 | 17.63 | 1.09 | 1.03 | 9.24 | 1.02 | 0.94 | 9.28 | 11.59 | −100 | −1285 | −50 | 38 |

According to Tables 1 to 3, in specimen No. 8, in which neither of metallic W powder and $WC_{1-x}$ (where $0<x\leq 1$) powder were added to the base powders, the carbon content of the cermet was higher than 6.50% in terms of mass and the aggregate part was not formed. Thus, the cermet had lower defect resistance and experienced early failure in the cutting testing. Also, in specimen No. 9, in which the temperature increase rate a was faster than 2° C./min, specimen No. 11, in which the temperature increase rate b was faster than 15° C./min, and specimens No. 12 and 13, in which the baking temperature $T_2$ was not within the range of from 1500° C. to 1600° C., the aggregate part was not formed. Thus, the cermet had lower defect resistance experienced early failure in the cutting testing. In addition, in specimens No. 12 and 13, the second hard phase was not formed. Furthermore, in specimen No. 10, in which the temperature increase rate b was slower than 4° C./min, the second hard phase was not formed and the aggregate part including the third hard phase only was formed, but the cermet had lower defect resistance.

In contrast, in specimens No. 1 to 7, which were cutting tools composed of the cermet having the composition of the present invention, each specimen produced superb defect resistance and had a long cutting time to failure.

REFERENCE SIGNS LIST

1 Cermet
2 Bonding phase
4 Hard phase
5 First hard phase
6 Second hard phase
7 2a-th hard phase
8 2b-th hard phase
9 Third hard phase
10 Aggregate part

The invention claimed is:
1. A cermet comprising:
a bonding phase comprising at least one of Co and Ni as a main component;
first hard particles composed of TiCN having a first average particle diameter of from 0.05 μm to 1 μm;
second hard particles having a second average particle diameter of from 0.2 μm to 2 μm which is greater than the first average particle diameter, and composed of a composite carbonitride of Ti, W and at least one metal other than Ti and W selected from among group IV, group V, and group VI metals of the periodic table; an
an interlinked region consisting of the second hard particles that are interlinked,
the interlinked region having a maximum length that is at least three times as great as the second average particle diameter,
wherein
the second hard particles comprise a 2a-th hard particles having a 2a-th W content of an inner part thereof that is more than 1.1 times as great as an 2a-th average W content of an outer circumferential part thereof, the interlinked region composes a proportion of from 20 area % to 60 area % of the cermet, and a carbon content of the cermet is from 6.00% to 6.50% in terms of mass of the cermet.

2. The cermet according to claim 1, wherein the second hard particles comprises a 2b-th hard particles having a 2b-th W content of an inner part thereof that is equal to or less than 1.1 times as great as an 2b-th average W content of an outer circumferential part thereof.

3. The cermet according to claim 1, further comprising third hard particles formed of:

a core part that is composed of TiCN; and an outer circumferential part that surrounds the core part, and that is composed of a composite carbonitride of Ti and at least one metal other than Ti selected from among group IV, group V, and group VI metals of the periodic table.

4. The cermet according to claim 1, wherein residual stress on the TiCN is from −500 MPa to −1200 MPa, residual stress on the composite carbonitride is from −1000 MPa to −1500 MPa, and residual stress on the bonding phase is from −400 MPa to −800 MPa.

5. The cermet according to claim 1, wherein the first hard particles have a surface area proportion ranging from 20 area % to 38 area % of the cermet.

6. A cutting tool comprising:

the cermet according to claim 1; and a layer on the cermet.

* * * * *